(12) United States Patent
Barry et al.

(10) Patent No.: US 9,404,831 B2
(45) Date of Patent: Aug. 2, 2016

(54) ARRAYED WAVE DIVISION MULTIPLEX TO EXTEND RANGE OF IOFDR FIBER BRAGG SENSING SYSTEM

(71) Applicants: Alexander M. Barry, Cypress, TX (US); Karl Kai Ku, Sugar Land, TX (US); Ian Mitchell, Radford, VA (US); William Johnston, Blacksburg, VA (US)

(72) Inventors: Alexander M. Barry, Cypress, TX (US); Karl Kai Ku, Sugar Land, TX (US); Ian Mitchell, Radford, VA (US); William Johnston, Blacksburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 92 days.

(21) Appl. No.: 14/524,714

(22) Filed: Oct. 27, 2014

(65) Prior Publication Data

US 2016/0116369 A1 Apr. 28, 2016

(51) Int. Cl.
*G01M 11/00* (2006.01)
*G02B 6/12* (2006.01)
*G01V 8/16* (2006.01)
*G01K 11/32* (2006.01)

(52) U.S. Cl.
CPC ....... *G01M 11/3172* (2013.01); *G01K 11/3206* (2013.01); *G01V 8/16* (2013.01); *G02B 6/12011* (2013.01); *G02B 6/12016* (2013.01); *G02B 6/12019* (2013.01)

(58) Field of Classification Search
None
See application file for complete search history.

(56) References Cited

U.S. PATENT DOCUMENTS

| | | | | |
|---|---|---|---|---|
| 7,418,171 B2* | 8/2008 | Grattan | ............... | G01L 1/242 374/E11.016 |
| 8,208,767 B2* | 6/2012 | Duncan | ............... | E21B 47/06 250/227.18 |
| 9,267,821 B2* | 2/2016 | Childers | ............ | G01D 5/35316 |
| 2004/0208523 A1* | 10/2004 | Carrick | ............... | H04B 10/071 398/32 |
| 2005/0224229 A1 | 10/2005 | Blacklaw | | |
| 2006/0196659 A1 | 9/2006 | Jee et al. | | |
| 2007/0047867 A1 | 3/2007 | Goldner | | |
| 2009/0326826 A1 | 12/2009 | Hull et al. | | |
| 2010/0014071 A1* | 1/2010 | Hartog | ............... | G01D 5/35361 356/73.1 |
| 2012/0237205 A1* | 9/2012 | Duncan | ............... | E21B 47/0006 398/25 |
| 2013/0093599 A1* | 4/2013 | Duncan | ............... | G01N 21/954 340/854.7 |
| 2013/0266039 A1 | 10/2013 | Legrand et al. | | |

OTHER PUBLICATIONS

Mihailov, Stephen; "Fiber Bragg Grating Sensors for Harsh Environments"; 2012; Retrieved from the internet; URL: www.mdpi.com/journal/sensors; 21 pages.
Notification of Transmittal of the International Search Report and the Written Opinion of the International Searching Authority; PCT/US2015/052609; Mailed Dec. 11, 2015: 9 pages.

* cited by examiner

*Primary Examiner* — John M Bedtelyon
(74) *Attorney, Agent, or Firm* — Cantor Colburn LLP

(57) ABSTRACT

An apparatus for performing a measurement of a downhole property includes an optical fiber having a first section that has a first set of fiber Bragg gratings with a first resonant wavelength inscribed therein and a second section that has a second set of fiber Bragg gratings with a second resonant wavelength different from the first resonant wavelength inscribed therein. The second section is in series with the first section. An optical interrogator emits a swept-wavelength frequency domain light signal having varying wavelength amplitude modulation into the optical fiber, receives a frequency domain return light signal, and transforms the frequency domain return signal into a time domain to determine a resonant wavelength shift of each fiber Bragg grating and the corresponding location of each interrogated fiber Bragg grating. A processor converts the resonant wavelength shift of each interrogated fiber Bragg grating into the downhole property measurement.

20 Claims, 4 Drawing Sheets

ARRAYED WAVE DIVISION MULTIPLEX TO EXTEND RANGE OF IOFDR FIBER BRAGG SENSING SYSTEM

BACKGROUND

Hydrocarbons are typically produced using boreholes that penetrate reservoirs of the hydrocarbons. The boreholes, which can be several kilometers long, may be lined with structures such as casings or screens required for production purposes. Conditions in the borehole and these structures need to be monitored as a function of depth in order to prevent damage to the structures and efficiently produce the hydrocarbons. Hence, it would be well received in the hydrocarbon production industry if new technology was developed to sense borehole structural and environmental conditions as a function of depth that provide increased accuracy and cost effectiveness.

BRIEF SUMMARY

Disclosed is an apparatus for performing a measurement of a downhole property. The apparatus includes: an optical fiber having a first section that has a first set of fiber Bragg gratings with a first resonant wavelength inscribed therein and a second section that has a second set of fiber Bragg gratings with a second resonant wavelength different from the first resonant wavelength inscribed therein, the second section being in series with the first section, a difference between the second resonant wavelength and the first resonant wavelength being greater than a dynamic wavelength range of each of the fiber Bragg gratings in the first set of fiber Bragg gratings; an optical interrogator in optical communication with the optical fiber and configured to: emit a frequency domain light signal into the optical fiber, the frequency domain light signal comprising a swept wavelength for a first time duration and a chirp comprising a modulation of amplitude with a varying of wavelength for a second time duration that is less than the first time duration; receive a frequency domain return light signal from the optical fiber due to the emitted frequency domain light signal, the frequency domain return light signal comprising a resonant wavelength shift of each fiber Bragg grating due to the downhole property and a corresponding location of each fiber Brag grating; and transform the frequency domain return signal into a time domain in order to determine the resonant wavelength shift of each fiber Bragg grating and the corresponding location of each interrogated fiber Bragg grating; and a processor configured to convert the resonant wavelength shift of each interrogated fiber Bragg grating into the downhole property measurement.

Also disclosed is a method for performing a measurement of a downhole property. The method includes: disposing an optical fiber into a borehole penetrating the earth, the optical fiber having a first section that has a first set of fiber Bragg gratings with a first resonant wavelength inscribed therein and a second section that has a second set of fiber Bragg gratings with a second resonant wavelength different from the first resonant wavelength inscribed therein, the second section being in series with the first section, a difference between the second resonant wavelength and the first resonant wavelength being greater than a dynamic wavelength range of each of the fiber Bragg gratings in the first set of fiber Bragg gratings; illuminating the optical fiber with a frequency domain light signal using an optical interrogator, the frequency domain light signal comprising a swept wavelength for a first time duration and a chirp comprising a modulation of amplitude with a varying of wavelength for a second time duration that is less than the first time duration; receiving a frequency domain return light signal from the optical fiber due to the emitted frequency domain light signal using the optical interrogator, the frequency domain return light signal comprising a resonant wavelength shift of each fiber Bragg grating due to the downhole property and a corresponding location of each fiber Brag grating; transforming the frequency domain return light signal into a time domain to determine the resonant wavelength shift of each fiber Bragg grating due to the downhole property and the corresponding location of each fiber Bragg grating using the optical interrogator; and converting the resonant wavelength shift of each fiber Bragg grating into the downhole property measurement using a processor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Figure 1:
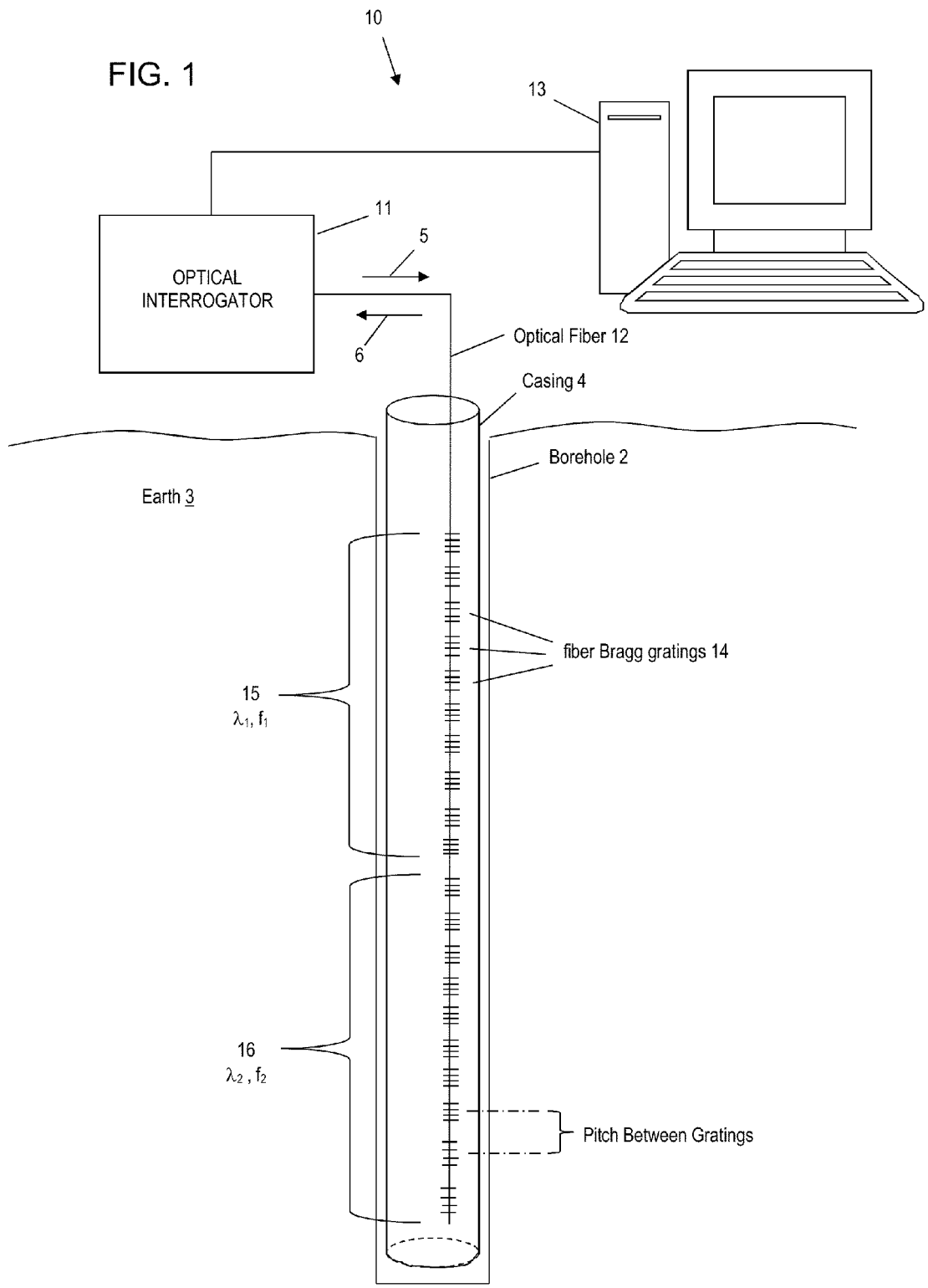
FIG. 1 illustrates a cross-sectional view of an exemplary embodiment of an optical sensing system having an optical fiber with fiber Bragg gratings disposed in a borehole penetrating the earth.
Figure 2:
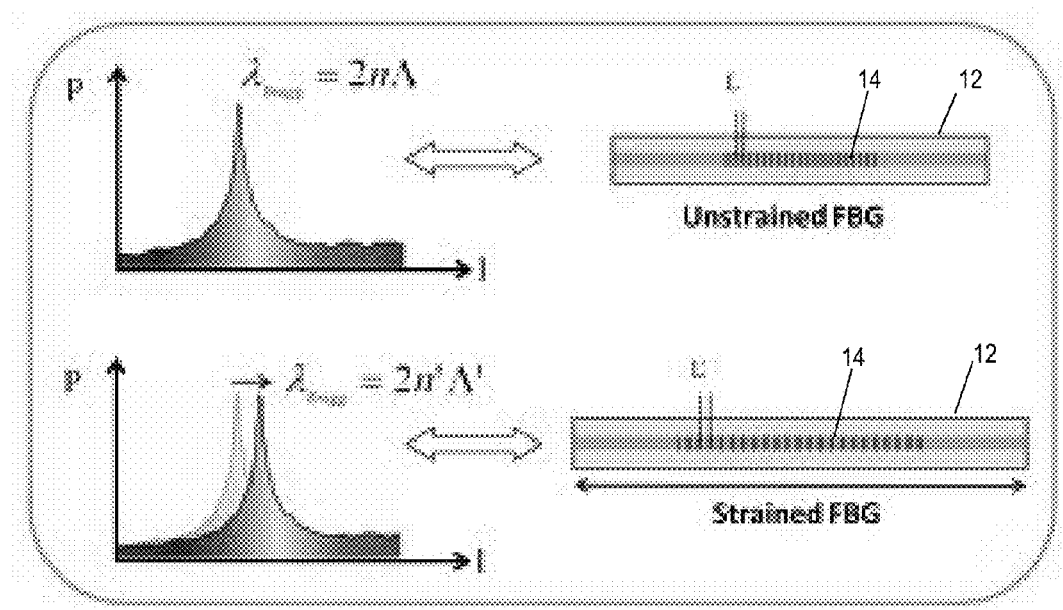
FIG. 2 depicts aspects of a resonant wavelength shift in a fiber Bragg grating for measuring a downhole parameter.

FIG. 1 illustrates a simplified schematic diagram of an optical sensing system 10. The optical system 10 includes an optical interrogator 11 in optical communication with an optical fiber 12. The optical fiber 12 includes a series of sensors referred to as fiber Bragg gratings 14. Each fiber Bragg grating 14 is configured to act as a filter to reflect incoming light at or near a resonant frequency characteristic of the fiber Bragg grating and to let the light of the other frequencies pass. Imposing a force or temperature change on the grating will cause the grating to distort and cause a shift in the resonant wavelength (or corresponding frequency) as illustrated in FIG. 2. By measuring the amount of the shift, the amplitude of the force or parameter causing the force, such as temperature change, can be measured. For example, the following equation may be used to correlate the shift in resonant wavelength to the change in temperature of the grating:

$$[\Delta \lambda\, B/\lambda\, B] = (1-p\, e)\epsilon + (\alpha\, \Lambda + \alpha\, n)\Delta T$$

where $\Delta\lambda\, B/\lambda\, B$ is the relative shift in the Bragg wavelength due to an applied strain ($\epsilon$) and a change in temperature ($\Delta T$), p e is the strain optic coefficient, $\alpha\, \Lambda$ is the thermal expansion coefficient of the optical fiber, and $\alpha\, n$ is the thermo-optic coefficient.

Non-limiting embodiments of the types of measurements performed by the fiber Bragg gratings include pressure, temperature, strain, force, acceleration, shape, and chemical composition. In non-limiting embodiments, the length of each fiber Bragg grating may be in a range of from a few millimeters to about two centimeters depending on the desired response characteristics of the gratings.

The optical fiber 12 in FIG. 1 is shown affixed to a casing 4 that is disposed in a borehole 2 penetrating the earth 3. The casing 4 represents any equipment, apparatus, or material that the optical fiber 12 may be used to perform measurements on. Additionally, environmental conditions in the borehole may be monitored or measured using the optical fiber 12.

Figure 3:
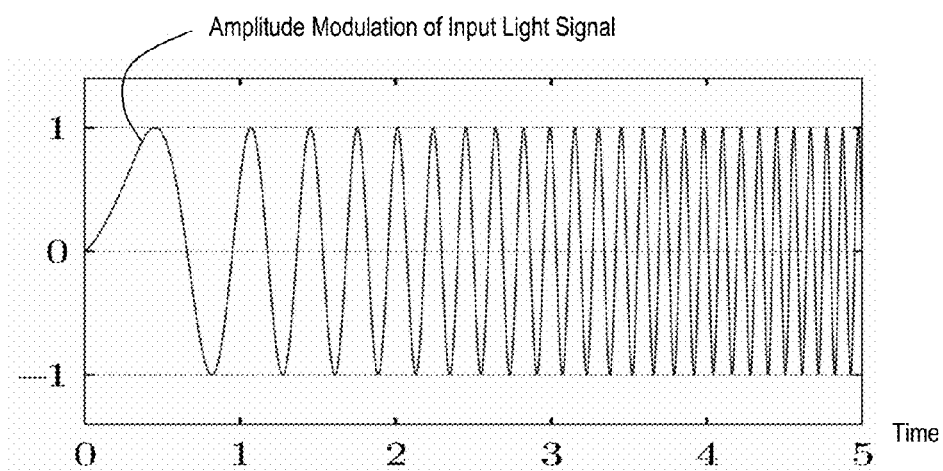
FIG. 3 depicts aspects of a chirped optical signal for interrogating the fiber Bragg gratings.

The optical interrogator 11 is configured to measure the shift in the resonant wavelength (or corresponding resonant frequency), if any, in each fiber Bragg grating and to determine the location in the optical fiber of each fiber Bragg grating being interrogated. In order to measure the resonant wavelength shifts and grating locations, the optical interrogator 11 is configured to transmit input light 5 into the optical fiber 12 and to receive reflected light 6 (also referred to as return light). The transmitted input light 5 and the reflected light 6 are transmitted and processed, respectively, in accordance with a method referred to as Incoherent Optical Frequency Domain Reflectometry (IOFDR). The amplitude of the input light 5 is chirped such that the input light amplitude varies such as in accordance with an increasing frequency as illustrated in FIG. 2. In one or more embodiments, the modulation frequency range of the chirp varies from 100 MHz to 1 GHz. The chirp frequency may be represented mathematically as $f_m(t)=kt+f_o$, while the amplitude as a function of time may be represented mathematically as $A(t)=A \cos(\pi k t^2 + 2\pi f_0 t + \theta_0)$. In addition, the wavelength (or corresponding frequency) of the input light 5 is swept. The wavelength sweep can be continuous while the input light 5 is being chirped repeatedly or the wavelength sweep can be in steps (stopping at each desired wavelength) to build the reflectivity of the gratings as a function of wavelength. In one or more embodiments, the bandwidth of the light wavelength sweep in about 50 nm. The term "chirp" is indicative of the small amount of time during which the chirp or the amplitude variations occurs with respect to the relatively large amount of time during which the light frequency is swept. In one or more embodiments, the time duration of a chirp is one millisecond while the time duration a frequency sweep is two seconds. Hence, the time duration of the wavelength sweep is at least a thousand times greater than the time duration of the chirp. FIG. 3 illustrates on example of a chirp for modulating the input light 5. For teaching purposes, the amplitude in FIG. 3 ranges nominally from −1 to +1 to depict aspects of amplitude modulation in a chirp realizing that the amplitudes may range from 0% to 100% in a non-limiting embodiment. The input light 5 having the chirp and swept wavelength has mathematical characteristics of a frequency domain signal and, hence, may be referred to as the frequency domain input light signal. Accordingly, the reflected light 6 may be referred to as the frequency domain return light signal. Because the reflected light 6 is in the frequency domain, the reflected light 6 is processed using a Fast Fourier Transform (FFT) to transform the information contained in the reflected light 6 into the time domain. Once, transformed into the time domain, the information in the reflected light 6 provides the magnitude or amount of the resonant wavelength shift of each fiber Bragg grating and its corresponding location in the optical fiber 12 knowing it will take a longer amount of time for the input light to reach and return from the gratings farther away from the optical interrogator 11 than those gratings that are closer.

Still referring to FIG. 1, a computer processing system 13 is coupled to the optical interrogator 11. The computer processing system 13 is configured to process the reflected light 6. For example, the computer processing system 13 can perform the FFT on received reflected light 6. Further, the computer processing system 13 can convert the magnitude of the resonant frequency shift into a parameter of interest such as temperature or strain for example using a mathematical relationship between parameter and the magnitude of the resonant frequency shift. The computer processing system 13 can be standalone or incorporated into the optical interrogator 11. Once the values of the parameter of interest are determined, it can be displayed to a user via a display or printer, it can be recorded for future use, or it can be input into an algorithm requiring that parameter for execution.

Figure 4:
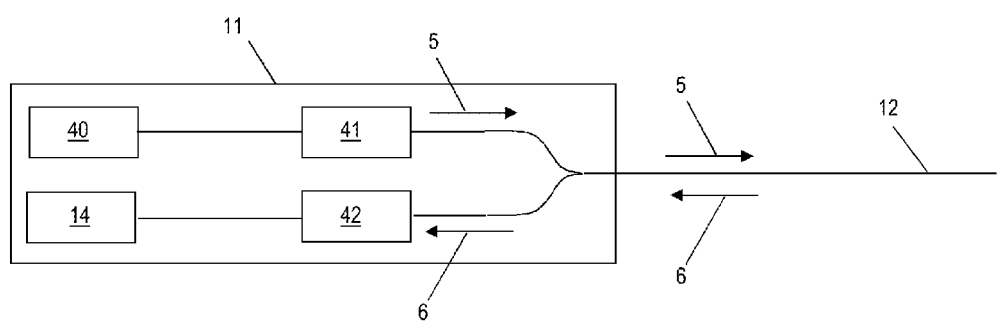
FIG. 4 depicts aspects of an optical interrogator.

FIG. 4 depicts aspects of the optical interrogator 11. The optical interrogator 11 includes a wavelength (or frequency) tunable light source 40 configured to generate a continuous wave of the input light 5 at a constant first frequency. To modulate the light input 5, the optical interrogator 11 includes a modulator 41 in optical communication with the tunable light source 40. The light input 5 is modulated (generally as a sine wave) to provide the chirp discussed above. The frequency of modulation is then swept by the modulator 41 to a second modulation frequency in a time-linear manner. While the wavelength of the input light 5 may be stepped or swept (i.e., is time-linear manner), the frequency of the amplitude modulation in the chirp is generally always swept. The reflected light 6 is received from the optical fiber 12 resulting from the change in the frequency of modulation. The optical interrogator 11 can have one light source 40 that is tunable to provide more than one optical wavelength of light input 5 or multiple light sources 40 may be used with each configured to provide one or more optical wavelengths of the input light 5.

Still referring to FIG. 4, the reflected light 6 is detected by a light detector 42 and then inversely transformed by the computer processing system 13 using the FFT into the time domain. Recognizing that time can be correlated to a spatial location by way of time of flight, reflections can then be correlated to a spatial location along the optical fiber 12 to produce a first set of measurements. Multiple measurements may be performed for each change in wavelength of the input light 5 as the wavelength of the input light 5 is swept. The frequency difference between input light 5 and the reflected light 6 is proportional to the time of flight (or distance), while the intensity of the reflected light 6 is a measure of the reflectivity of the grating at the current laser frequency.

In one or more embodiments, each fiber Bragg grating 14 has a dynamic range of about five (5) nm, which can result from a temperature change of 200° C. That is, the maximum amount of resonant wavelength shift is about 5 nm. With a desired distance between sensors of about one (1) meter, a one kilometer optical fiber will have about 1000 sensors or fiber Bragg gratings in that the length of each grating is small in comparison to the distance between adjacent gratings. The 1000 sensors over one kilometer, though, is a current practical limit to obtain rapid accurate sensor readings based on the practical limitations of current opto-electronics. Attempts to obtain readings with this spacing over longer distances raises obstacles such as increased processing times and degraded signal quality. Some of these obstacles may be non-linear resulting greater non-linear reading degradation for a linear increase in distance.

In order to overcome these obstacles, the optical fiber 12 is divided into two or more sections. For teaching purposes, the optical fiber 12 is divided into a first section 15 and a second section 16 as illustrated in FIG. 1. All of the fiber Bragg gratings in the first section 15 have the same nominal resonant wavelength or frequency referred to as the first resonant wavelength $\lambda_1$ or first resonant frequency $f_1$. For example, the nominal wavelength of the gratings in the first section 15 may be 1540 nm. All of the fiber Bragg gratings in the second section 16 have the same nominal resonant wavelength or frequency referred to as the second resonant wavelength $\lambda_2$ or second resonant frequency $f_2$. For example, the nominal wavelength of the gratings in the second section 16 may be 1550 nm. In one or more embodiments, the difference between nominal resonant wavelengths is at least greater than the dynamic range of resonant wavelengths of the fiber Bragg gratings in order to avoid interference between readings in the different sections. It can be appreciated that the optical fiber 12 may have three or more sections in order to increase the distance at which parameters may be sensed at a fixed pitch.

Figure 5:
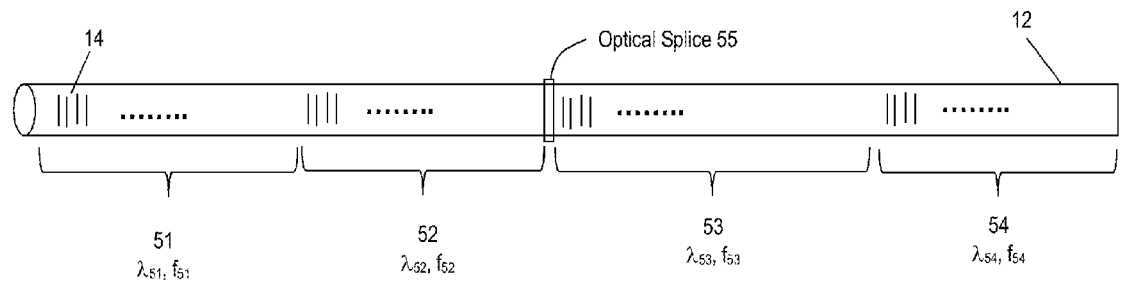
FIG. 5 depicts aspects of the optical fiber having four sections of fiber Bragg gratings with each section having gratings with the same resonant frequency that is different from the resonant frequency of the other sections.

FIG. 5 illustrates an embodiment of the optical fiber 12 having four sections, section 51-54. All of the nominal resonant wavelengths for each of the gratings in each section have the same nominal resonant wavelength $\lambda_{51}$, $\lambda_{52}$, $\lambda_{53}$, $\lambda_{54}$ or frequency $f_{51}$, $f_{52}$, $f_{53}$, $f_{54}$ for the sections 51-54, respectively. The nominal resonant wavelength characterizing each section is separated from the section having the nearest (in magnitude) nominal wavelength by at least the desired dynamic range of the gratings. For example, if the gratings have a desired dynamic range of 5 nm and one section has a nominal resonant wavelength of 1540 nm, then the closest nominal wavelength is 1535 and/or 1545 nm. An optical splice 55 may be used to couple one section to another section. It can be appreciated that each section may have a length that is different from the length of other sections.

In one or more embodiments, the optical fiber 12 may have a length that exceeds several kilometers with each kilometer being a section having fiber Bragg gratings of the same resonant wavelength. In one or more embodiments, the time duration of the wavelength sweep of the input light may be one second while the time duration of the chirp may be ten milliseconds to give a ratio of at least 100. In one or more embodiments, the time duration of the chirp may be ten milliseconds or less. In one or more embodiments, the distance between adjacent fiber Bragg gratings may be one-half meter or more.

Figure 6:
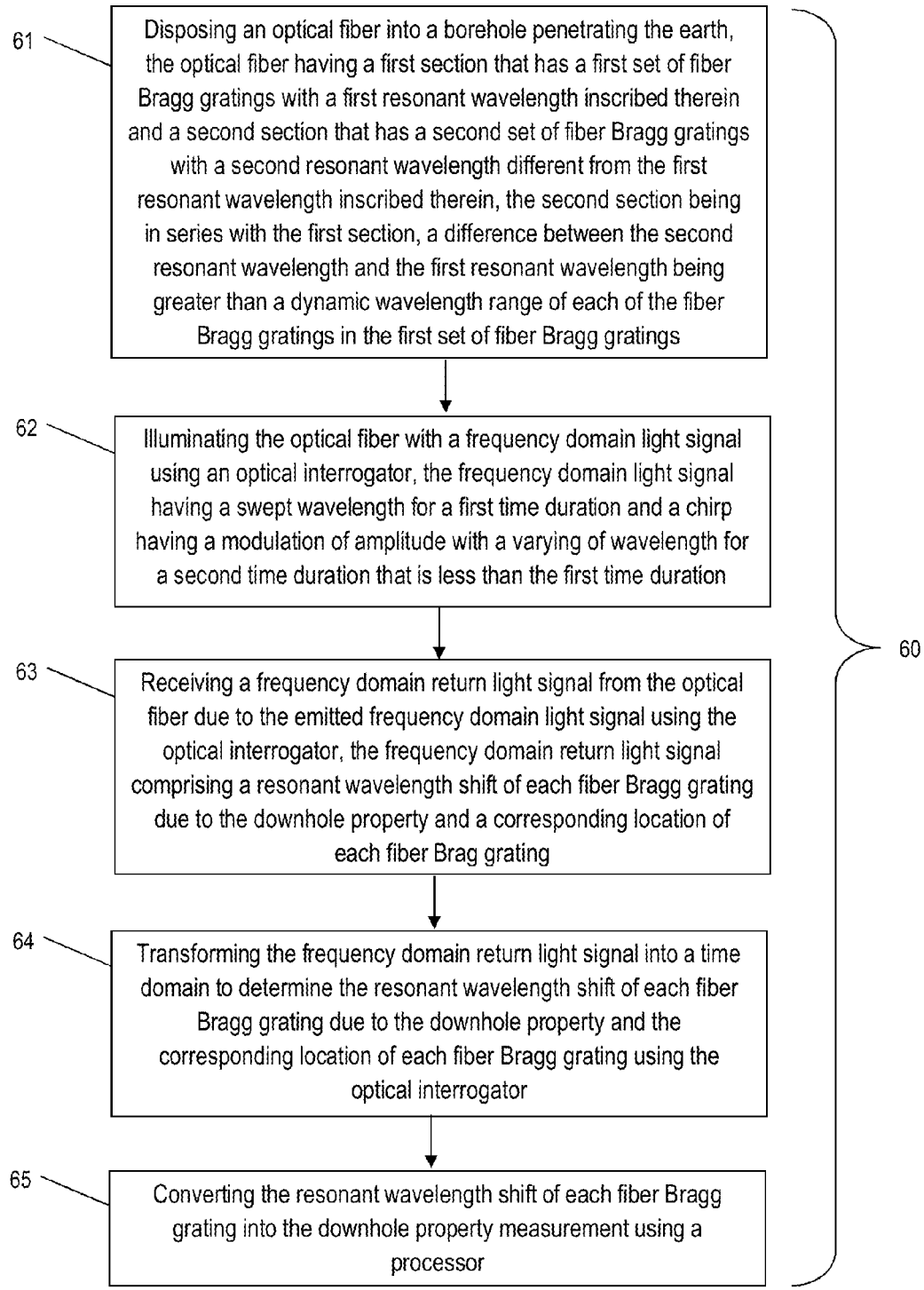
FIG. 6 is a flow chart for a method for performing a measurement of a property downhole.

FIG. 6 is a flow chart for a method 60 for performing a measurement of a downhole property. Block 101 calls for disposing an optical fiber into a borehole penetrating the earth, the optical fiber having a first section that has a first set of fiber Bragg gratings with a first resonant wavelength inscribed therein and a second section that has a second set of fiber Bragg gratings with a second resonant wavelength different from the first resonant wavelength inscribed therein, the second section being in series with the first section, a difference between the second resonant wavelength and the first resonant wavelength being greater than a dynamic wavelength range of each of the fiber Bragg gratings in the first set of fiber Bragg gratings. Block 102 calls for illuminating the optical fiber with a frequency domain light signal using an optical interrogator, the frequency domain light signal comprising a swept wavelength for a first time duration and a chirp comprising a modulation of amplitude with a varying of wavelength for a second time duration that is less than the first time duration. Block 103 calls for receiving a frequency domain return light signal from the optical fiber due to the emitted frequency domain light signal using the optical interrogator, the frequency domain return light signal comprising a resonant wavelength shift of each fiber Bragg grating due to the downhole property and a corresponding location of each fiber Brag grating. Block 104 calls for transforming the frequency domain return light signal into a time domain to determine the resonant wavelength shift of each fiber Bragg grating due to the downhole property and the corresponding location of each fiber Bragg grating using the optical interrogator. Block 105 calls for converting the resonant wavelength shift of each fiber Bragg grating into the downhole property measurement using a processor.

The method 60 may also include comprising transmitting the downhole property measurement of each fiber Bragg grating and corresponding location of each fiber Bragg grating to an output receiving device. In addition, the method 60 may also include at least one of (i) displaying the downhole property measurement of each fiber Bragg grating and corresponding location of each fiber Bragg grating to a user using a user interface, (ii) providing an alert signal if any downhole property measurement exceeds a threshold, and (iii) storing the downhole property measurement of each fiber Bragg grating and corresponding location of each fiber Bragg grating in a non-transitory memory device. The method 60 may further include coupling the optical fiber to a downhole structure where the optical fiber is configured to measure a property of the downhole structure.

In support of the teachings herein, various analysis components may be used, including a digital and/or an analog system. For example, the optical interrogator 11 or the computer processing system 13 may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. Processed data such as a result of an implemented method may be transmitted as a signal via a processor output interface to a signal receiving device. The signal receiving device may be a display monitor or printer for presenting the result to a user. Alternatively or in addition, the signal receiving device may be memory or a storage medium. It can be appreciated that storing the result in memory or the storage medium will transform the memory or storage medium into a new state (containing the result) from a prior state (not containing the result). Further, an alert signal may be transmitted from the processor to a user interface if the result exceeds a threshold value.

Further, various other components may be included and called upon for providing for aspects of the teachings herein. For example, a power, cooling component, heating component, magnet, electromagnet, sensor, electrode, transmitter, receiver, transceiver, antenna, controller, optical unit (e.g., lenses, splitters, couplers), electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first" and "second" do not denote a particular order, but are used to distinguish different elements.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for performing a measurement of a downhole property, the apparatus comprising:
    an optical fiber having a first section that has a first set of fiber Bragg gratings with a first resonant wavelength inscribed therein and a second section that has a second set of fiber Bragg gratings with a second resonant wavelength different from the first resonant wavelength inscribed therein, the second section being in series with the first section, a difference between the second resonant wavelength and the first resonant wavelength being greater than a dynamic wavelength range of each of the fiber Bragg gratings in the first set of fiber Bragg gratings;
    an optical interrogator in optical communication with the optical fiber and configured to: emit a frequency domain light signal into the optical fiber, the frequency domain light signal comprising a swept wavelength for a first time duration and a chirp comprising a modulation of amplitude with a varying of wavelength for a second time duration that is less than the first time duration; receive a frequency domain return light signal from the optical fiber due to the emitted frequency domain light signal, the frequency domain return light signal comprising a resonant wavelength shift of each fiber Bragg grating due to the downhole property and a corresponding location of each fiber Bragg grating; and transform the frequency domain return signal into a time domain in order to determine the resonant wavelength shift of each fiber Bragg grating and the corresponding location of each interrogated fiber Bragg grating; and
    a processor configured to convert the resonant wavelength shift of each interrogated fiber Bragg grating into the downhole property measurement.

2. The apparatus according to claim 1, wherein first time duration is at least 100 times greater than the second time duration.

3. The apparatus according to claim 2, wherein the second time duration is ten milliseconds or less.

4. The apparatus according to claim 1, wherein a distance between adjacent fiber Bragg gratings is one-half meter or more.

5. The apparatus according to claim 4 wherein a length of the first section is one kilometer or more and the length of the second section is one kilometer or more.

6. The apparatus according to claim 4 wherein a length of the first section is one kilometer or less and the length of the second section is one kilometer or less.

7. The apparatus according to claim 1, wherein the optical interrogator comprise a laser configured to emit a laser beam with a swept wavelength difference of 50 nm or greater.

8. The apparatus according to claim 1, wherein the optical interrogator comprise a laser configured to emit a laser beam with a swept wavelength range of 50 nm or less.

9. The apparatus according to claim 1, wherein a dynamic range of each fiber Bragg grating is 5 nm or less.

10. The apparatus according to claim 9, wherein a difference between the first resonant wavelength and the second resonant wavelength is at least 5 nm.

11. The apparatus according to claim 1, wherein the second section of the optical fiber comprises two or more sections, each of the two or more sections having fiber Bragg gratings with the same resonant wavelength that is different from the resonant wavelengths of the other sections.

12. The apparatus according to claim 1, further comprising an optical splice between the first section and the second section.

13. The apparatus according to claim 1, wherein the optical fiber is a continuous optical fiber between the first section and the second section.

14. The apparatus according to claim 1, further comprising an output device coupled to the processor and configured to receive the downhole property measurement of each fiber Bragg grating and the corresponding location of each fiber Bragg grating.

15. The apparatus according to claim 1, wherein the optical fiber is coupled to a downhole structure and configured to measure a property of the downhole structure.

16. The apparatus according to claim 1, wherein the optical fiber is configured to measure a downhole environment property.

17. A method for performing a measurement of a downhole property, the method comprising:
    disposing an optical fiber into a borehole penetrating the earth, the optical fiber having a first section that has a first set of fiber Bragg gratings with a first resonant wavelength inscribed therein and a second section that has a second set of fiber Bragg gratings with a second resonant wavelength different from the first resonant wavelength inscribed therein, the second section being in series with the first section, a difference between the second resonant wavelength and the first resonant wavelength being greater than a dynamic wavelength range of each of the fiber Bragg gratings in the first set of fiber Bragg gratings;

illuminating the optical fiber with a frequency domain light signal using an optical interrogator, the frequency domain light signal comprising a swept wavelength for a first time duration and a chirp comprising a modulation of amplitude with a varying of wavelength for a second time duration that is less than the first time duration;

receiving a frequency domain return light signal from the optical fiber due to the emitted frequency domain light signal using the optical interrogator, the frequency domain return light signal comprising a resonant wavelength shift of each fiber Bragg grating due to the downhole property and a corresponding location of each fiber Bragg grating;

transforming the frequency domain return light signal into a time domain to determine the resonant wavelength shift of each fiber Bragg grating due to the downhole property and the corresponding location of each fiber Bragg grating using the optical interrogator; and converting the resonant wavelength shift of each fiber Bragg grating into the downhole property measurement using a processor.

18. The method according to claim 17, further comprising transmitting the downhole property measurement of each fiber Bragg grating and corresponding location of each fiber Bragg grating to an output receiving device.

19. The method according to claim 18, further comprising at least one of (i) displaying the downhole property measurement of each fiber Bragg grating and corresponding location of each fiber Bragg grating to a user using a user interface, (ii) providing an alert signal if any downhole property measurement exceeds a threshold, and (iii) storing the downhole property measurement of each fiber Bragg grating and corresponding location of each fiber Bragg grating in a non-transitory memory device.

20. The method according to claim 17, further comprising coupling the optical fiber to a downhole structure, the optical fiber being configured to measure a property of the downhole structure.

* * * * *